(12) United States Patent
Watabe et al.

(10) Patent No.: US 7,739,437 B2
(45) Date of Patent: Jun. 15, 2010

(54) ACCESS ARBITER AND ARBITRABLE CONDITION VERIFICATION DEVICE

(75) Inventors: Akihiro Watabe, Nara (JP); Takayuki Morishige, Osaka (JP); Yuichiro Aihara, Osaka (JP)

(73) Assignee: Panasonic Corporation, Osaka (JP)

( * ) Notice: Subject to any disclaimer, the term of this patent is extended or adjusted under 35 U.S.C. 154(b) by 143 days.

(21) Appl. No.: 11/883,366

(22) PCT Filed: Jan. 26, 2006

(86) PCT No.: PCT/JP2006/301182

§ 371 (c)(1),
(2), (4) Date: Jul. 31, 2007

(87) PCT Pub. No.: WO2006/080371

PCT Pub. Date: Aug. 3, 2006

(65) Prior Publication Data

US 2008/0263249 A1 Oct. 23, 2008

(30) Foreign Application Priority Data

Jan. 31, 2005 (JP) ............................. 2005-024312

(51) Int. Cl.
*G06F 12/00* (2006.01)
(52) U.S. Cl. ........................ 710/244; 710/116; 710/117
(58) Field of Classification Search ................... 710/45, 710/113, 116, 117, 240, 241, 144
See application file for complete search history.

(56) References Cited

U.S. PATENT DOCUMENTS

| 4,257,095 A | 3/1981 | Nadir |
| 4,672,536 A * | 6/1987 | Giroir et al. ................. 710/241 |
| 4,953,081 A * | 8/1990 | Feal et al. .................... 710/111 |
| 5,241,632 A * | 8/1993 | O'Connell et al. .......... 710/117 |
| 5,778,200 A * | 7/1998 | Gulick ........................ 710/113 |
| 5,956,493 A | 9/1999 | Hewitt et al. |
| 6,073,132 A * | 6/2000 | Gehman ........................ 707/9 |
| 6,092,137 A * | 7/2000 | Huang et al. ................. 710/111 |
| 6,295,553 B1 * | 9/2001 | Gilbertson et al. .......... 709/207 |
| 6,330,647 B1 * | 12/2001 | Jeddeloh et al. ............. 711/158 |

(Continued)

FOREIGN PATENT DOCUMENTS

EP  1 076 293 A1  8/2000

(Continued)

OTHER PUBLICATIONS

European Search Report issued in European Patent Application No. EP 06 71 2364, mailed Oct. 1, 2008.
Japanese Office Action, with English translation, issued in Japanese Patent Application No. 2007-500555, mailed Feb. 16, 2010.

*Primary Examiner*—Khanh Dang
(74) *Attorney, Agent, or Firm*—McDermott Will & Emery LLP (57) ABSTRACT

A priority control value, which is smaller as the priority of access by each of requesters is higher, decreases with the lapse of time when an access request is issued. When the access is completed, the priority control value increases by a priority decrease value (PERIOD). When there is no access request, the priority control value decreases to a reference priority value (TMIN) and is then maintained at the reference priority value. Access permission is given to the one of the requesters issuing requests which has the smallest priority control value. As a result, proper arbitration is performed at a high speed with a simple hardware configuration.

8 Claims, 4 Drawing Sheets

U.S. PATENT DOCUMENTS

| | | | |
|---|---|---|---|
| 6,732,209 B1 * | 5/2004 | Cherukuri et al. | 710/240 |
| 7,062,582 B1 * | 6/2006 | Chowdhuri | 710/116 |
| 7,231,477 B2 * | 6/2007 | Toyokura | 710/241 |
| 7,236,499 B2 * | 6/2007 | Kurupati | 370/462 |
| 7,404,024 B2 * | 7/2008 | Ries et al. | 710/244 |
| 7,472,213 B2 * | 12/2008 | Fukuyama et al. | 710/241 |
| 2006/0155903 A1 * | 7/2006 | Soga et al. | 710/240 |
| 2006/0155904 A1 * | 7/2006 | Murakami et al. | 710/240 |

FOREIGN PATENT DOCUMENTS

| | | |
|---|---|---|
| JP | 02-027461 | 1/1990 |
| JP | 03-263158 | 11/1991 |
| JP | 05-274162 | 10/1993 |
| JP | 06-309274 | 11/1994 |
| JP | 08-123753 | 5/1996 |
| JP | 2001-167049 | 6/2001 |
| JP | 2001-516100 A | 9/2001 |
| JP | 2003-114870 | 4/2003 |
| JP | 2003-256358 | 9/2003 |
| JP | 2004-078508 | 3/2004 |
| JP | 2004-118546 | 4/2004 |
| WO | WO 99/13405 | 3/1999 |

* cited by examiner

ACCESS ARBITER AND ARBITRABLE CONDITION VERIFICATION DEVICE

RELATED APPLICATIONS

This application is the U.S. National Phase under 35 U.S.C. §371 of International Application No. PCT/JP2006/301182, filed on Jan. 26, 2006, which in turn claims the benefit of Japanese Application No. 2005-024312, filed on Jan. 31, 2005, the disclosure of which Application is incorporated by reference herein.

TECHNICAL FIELD

The present invention relates to an access arbiter used for controlling a memory interface or a task.

BACKGROUND ART

As a system LSI (Large Scale Integrated circuit) has become used in recent years, it has been common practice to integrate a plurality of functional blocks having the respective functions of a plurality of previous chips in one chip. In such a case, the integration of an external memory is performed in most cases to achieve a cost reduction. In the case where a multi-chip LSI is used as previously, a plurality of memories are provided and occupied by the respective LSIs in most cases. In a system LSI, by contrast, it has become a very frequent practice to share a memory among a plurality of functional blocks. As a result, to arbitrate competing accesses from the plurality of functional blocks, an access arbiter is used.

The performance of the access arbiter is particularly important when processing having a high real-time property is required as in an AV processing block in digital AV (audio visual) home appliances. For example, a hardware mechanism has been known which uses a round robin method capable of guaranteeing the worst access time (the longest time period from the issue of an access request until access is made) to such processing of which a high real-time property is required (see, e.g., Patent Document 1).

Another mechanism has also been known which uses a method termed EDF (Earliest Deadline First) to schedule the execution of a plurality of programs in multitasking processing, though it does not particularly concern bus arbitration. Specifically, a process is performed which generates a waiting queue and performs sorting depending on the length of a time period until the deadline when a new task is generated or the like (see, e.g., Patent Document 2).

On the other hand, in recent digital AV (audio visual) home appliances, a structure can be considered in which, e.g., an AV processing block for performing AV processing having a high real-time property and a versatile microcomputer for performing complicated control comparable to that performed by a computer, such as a GUI (graphical user interface), are provided within a system LSI so that the individual functional blocks share one memory. In such a system requiring a real-time property and a system which does not require a high real-time property but requires high performance (averaged performance) such as a microcomputer, efficient arbitration between memory accesses that have been integrated to achieve compatibility between the real-time property and performance is particularly necessary.

Patent Document 1: Published Japanese Translation of PCT International Publication for Patent Application No. 2001-516100

Patent Document 2: Japanese Laid-Open Patent Publication No. HEI 5-274162

DISCLOSURE OF THE INVENTION

Problems to be Solved by the Invention

Although a round robin method as mentioned above can guarantee the real-time property, an excessively high processing ability is required for processes as an arbitration target. That is, because accesses are permitted in a given order irrespective of the priorities of the access requesting processes, a processing ability which allows the process with a higher priority to be performed after the performance of the process with a lower priority is required.

On the other hand, it has been known that the EDF method can perform optimum scheduling. However, it is difficult to perform the process of rearranging items in the waiting queue upon each generation of a task or each completion of execution by using hardware. Therefore, it is difficult to apply the EDF method to a case where a high-speed response is necessary, such as in bus arbitration.

Moreover, although the EDF method can be easily applied to a real-time process of which the deadline is distinctly determined, it is not always easily applied to a non-real-time process which has no distinct deadline (no restriction that individual processes should be completed by these or other time limits, though an averaged processing ability is required). In particular, when a real-time process and a non-real-time process are present in mixed relation, it is difficult to perform efficient arbitration between memory accesses that have been integrated to achieve compatibility between real-time property and performance.

In view of the foregoing, it is therefore an object of the present invention to provide an access arbiter which allows proper arbitration to be performed at a high speed with a simple hardware configuration and also allows, even a real-time process and a non-real-time process are present in mixed relation, these processes to be handled in common to easily implement efficient arbitration capable of achieving real-time property and performance.

Means for Solving the Problems

To solve the problems described above, an access arbiter according to a first aspect of an embodiment of the present invention is an access arbiter for arbitrating between access requests from a plurality of requesters to an access target, the access arbiter comprising: priority holding means for holding a priority of access permission to each of the requesters; priority control means for controlling the priority held by the priority holding means; and access permitting means for giving access permission to the requester having the lowest priority held by the priority holding means, wherein, when there is an access request from the requester or when there is no access request and the priority is lower than a predetermined reference priority, the priority control means increases the priority by a predetermined degree of increase in accordance with an elapsed time and, when access is permitted, the priority control means decreases the priority by a predetermined degree of decrease.

An access arbiter according to a second aspect of the embodiment of the present invention is the access arbiter according to the first aspect, wherein each of the degrees of increase and decrease of the priority is set for each of the requesters.

An access arbiter according to a third aspect of the embodiment of the present invention is the access arbiter according to the first aspect, wherein the decrease of the priority is performed at a time at which the access by the requester is completed.

The arrangements allow arbitration to be performed such that access is made in a proper response time by a process of the order of addition and subtraction without requiring a sorting process for a waiting queue. In addition, it is also possible to perform easy arbitration for a so-called non-real-time process in conjunction with a real-time process by setting the value of the reference property or the like.

An access arbiter according to a fourth aspect of the embodiment of the present invention is the access arbiter according to the first aspect, wherein the access permitting means is constructed not to give access permission to the requester having the priority that has become lower than a predetermined permission suspension priority due to the decrease of the priority.

The arrangement can prevent a value corresponding to the priority from being excessively large or small when access requests are consecutively issued.

An access arbiter according to a fifth aspect of the embodiment of the present invention is the access arbiter according to the first aspect, wherein the priority control means is constructed to set the priority to at least any predetermined one of the requesters to the reference priority when the priorities to all the requesters are lower than the reference priority.

An access arbiter according to a sixth aspect of the embodiment of the present invention is the access arbiter according to the first aspect, wherein the priority control means is constructed to set the priority to at least any predetermined one of the requesters to the reference priority when there is no access request from any of the requesters.

An access arbiter according to a seventh aspect of the embodiment of the present invention is the access arbiter according to the first aspect, wherein the priority control means is constructed to set, when there is an access request from only one of the requesters, the priority to at least any predetermined one of the other requesters from which there is no access request to the reference priority.

In the arrangement, even when the priority is lowered by consecutive access requests, the priority is restored to allow easy access permission when there is no other access request.

An access arbiter according to an eighth aspect of the embodiment of the present invention is the access arbiter according to the first aspect, wherein the priority control means is constructed to output an error signal when the access permission is not given to any of the requesters until the priority reaches a predetermined limit priority.

This allows easy checking of whether or not proper arbitration is performed.

Effect of the Invention

In accordance with the present invention, efficient arbitration capable of achieving, e.g., compatibility between real-time property and performance can be implemented with a simple circuit for bus arbitration when a plurality of processes and devices (requesters) share a memory or the like.

BRIEF DESCRIPTION OF THE DRAWINGS

FIG. 2 is an illustrative view showing an example of the relationship between an arbitrating operation and changes in priority control value or the like;

DESCRIPTION OF NUMERALS

100 Access Arbiter
101 Priority Control Value Register
102 Priority Control Value Control Unit
103 Selection Unit
104 Access Control Unit
201, 202 Requesters
203 Memory

BEST MODE FOR CARRYING OUT THE INVENTION

Figure 1:
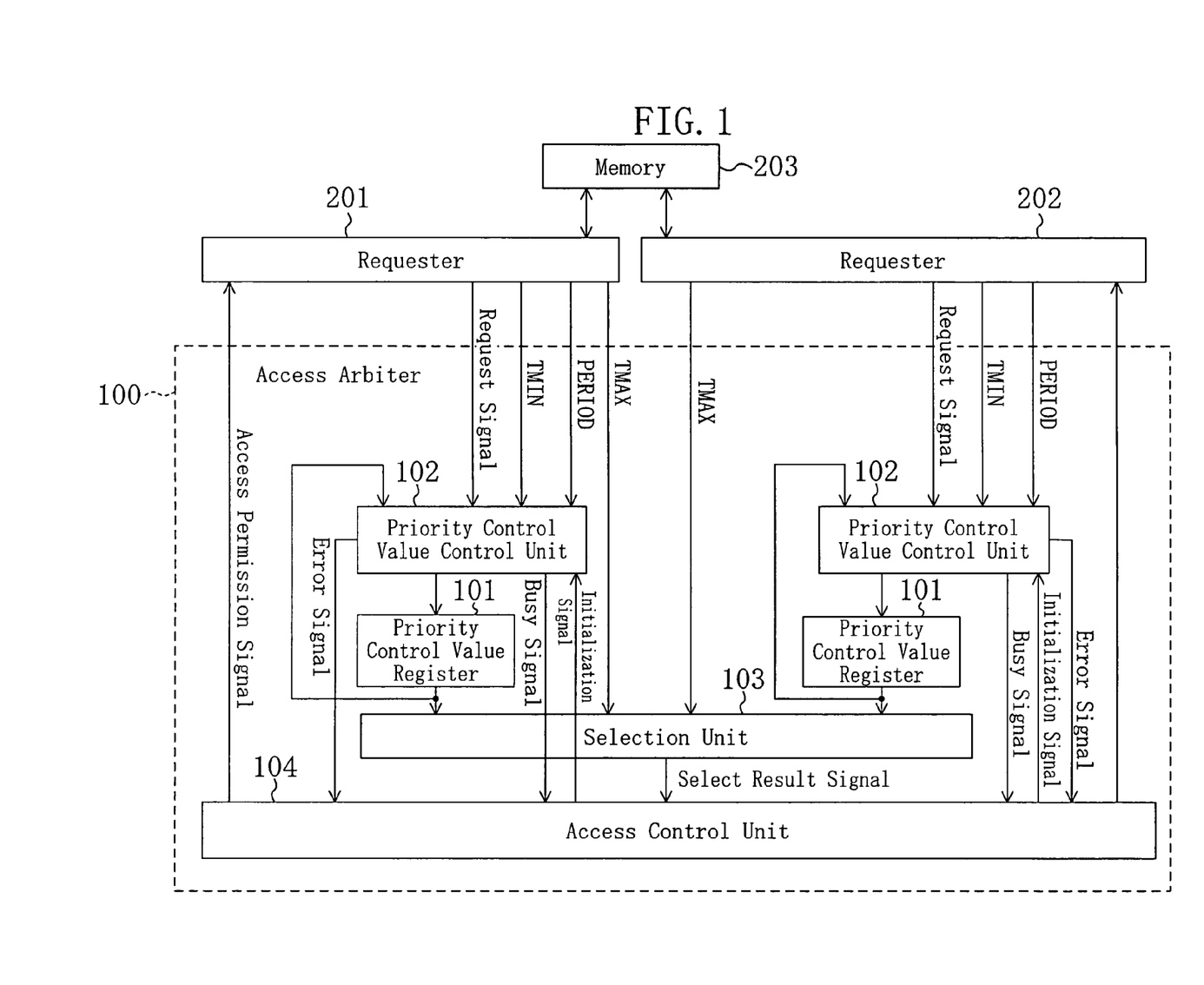
FIG. 1 is a block diagram showing a structure of an access arbiter.

As an embodiment of the present invention, an example of an access arbiter 100 for arbitrating between accesses made by two requesters 201 and 202 to a memory 203 will be described, as shown in FIG. 1.

The access arbiter 100 is constructed to perform arbitration based on reference priority values (TMIN), priority decrease values (PERIOD), and permission suspension priority values (TMAX) given from the requesters 201 and 202 (although the values shown above and priority control values described later are values related to priority, for the convenience of description, each of them is expressed in the number of clock cycles or in a time dimension corresponding thereto used as a unit of measurement).

Each of the reference priority values (TMIN) shows that, when a request is issued in a request cycle not shorter than a predetermined period, an access should be completed within a response time (the number of clock cycles) of the value from the issue of the request. The request cycle not shorter than a predetermined period is a cycle which satisfies the expression: Cumulative Value of (Request Cycle−Priority Decrease Value (PERIOD))≧0 (where Cumulative Value is reset to 0 every time Cumulative Value>0 is satisfied). The response time can be guaranteed by the satisfaction of a predetermined condition by the reference priority value (TMIN), the priority decrease value (PERIOD), and a time (Taccess) required for access by each of the requesters 201 and 202, which will be described later in detail.

Each of the permission suspension priority values (TMAX) shows that, while the priority control value is exceeding the permission suspension priority value, access need not be permitted regardless of the magnitude relationship with the priority control value of the other requester (the priority control value increases to exceed the permission suspension priority value (TMAX) when, e.g., requests in cycles shorter than the priority decrease value (PERIOD) are consecutively issued and, even when access is not permitted while the priority control value is exceeding the permission suspension priority value (TMAX), an average response time is maintained).

Although absolute responsiveness is not necessarily required of a non-real-time process or processor, an arbitrating operation can be performed without particularly distinguishing between a non-real-time system and a real-time system by setting the individual parameters shown above in the same manner as in the real-time system. This allows, e.g., the remaining bandwidth of real-time access to be given as a minimum guarantee to non-real-time access (in this case also, performance not lower than that can be substantially achieved when the process has allowance, as will be described later).

(Access Arbiter 100)

Specifically, the access arbiter 100 comprises priority control value registers 101 for holding respective priority control values for the requesters 201 and 202, priority control value control units 102 for controlling the foregoing priority control values, a selection unit 103 for selecting between the requesters 201 and 202 to which access is permitted based on the respective priority control values held in the priority control value registers 101, and an access control unit 104 for controlling access based on the result of the selection.

Each of the priority control values held in the priority control value registers 101 shows, e.g., a time period (the number of clock cycles) until the time at which access by each of the requesters 201 and 202 should be completed. In this case, therefore, the priority is higher as the value is smaller. Specifically, each of the priority control value registers 101 is constructed by using, e.g., a counter.

Figure 2:
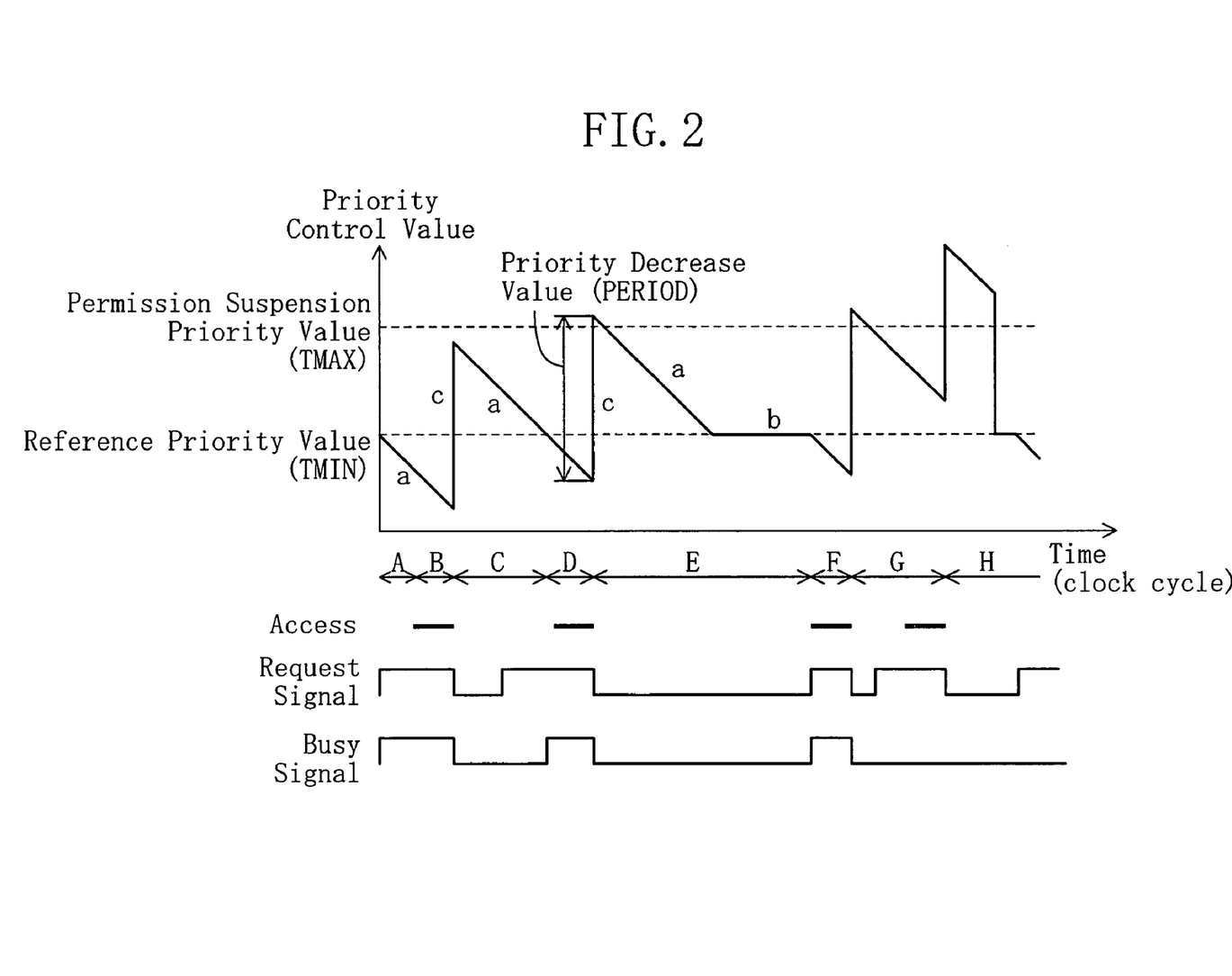

Each of the priority control value control units 102 controls the priority control value held in the priority control value register 101 based on the predetermined reference priority value (TMIN) and priority decrease value (PERIOD) given from the requester 201 or 202, as shown in FIG. 2 and the following description.

(a) The priority control value is decreased by one in each clock cycle.

(b) However, when there is no request from the requester 201 or 202 (when a request signal is not asserted), the priority control value is not reduced to a value smaller than the reference priority value (TMIN).

(c) When access to the memory 203 by the requester 201 or 202 is completed, the priority control value is increased by the priority decrease value (PERIOD). The completion of the access is specifically sensed through, e.g., the negation of the request signal at the completion of the access.

The priority control value control unit 102 further outputs a busy signal which is negated when the priority control value is not smaller than the reference priority value (TMIN) (when the priority is lower). When the busy signal is negated for either of the requesters 201 and 202, the priority control value control unit 102 sets the priority control value to the reference priority value (TMIN) in response to the assertion of an initialization signal from the access control unit 104, as will be described later.

The priority control value control unit 102 also outputs an error signal which is asserted when the priority control value becomes negative (when the priority control value is 0 before 1 is subtracted therefrom). Although the error signal can be used for the purpose of, e.g., verifying that arbitration does not fail upon debugging the access arbiter or the like, the error signal need not necessarily be outputted.

The selection unit 103 selects, of the requesters 201 and 202 issuing the asserted request signals, the one having the smaller priority control value held in the priority control value register 101 and outputs a select result signal. However, when the priority control values are exceeding the permission suspension priority values (TMAX) outputted from the requesters 201 and 202, the selection unit 103 is prevented from selecting.

The access control unit 104 outputs an access permission signal to either of the requesters 201 and 202 in accordance with the select result signal. When the busy signals outputted from all the priority control value control units 102 are negated as described above (when the priority control value is not smaller than the reference priority value (TMIN) for each of the requesters 201 and 202, the access control unit 104 asserts the initialization signal outputted to the priority control value control unit 102 corresponding to at least one of the requesters 201 and 202 and sets the priority control value to the reference priority value (TMIN).

The above-mentioned values, including the reference priority values (TMIN), need not necessarily be given from the requesters 201 and 202. The values may also be given from another management device or preliminarily set to the access arbiter. When the values are held in a register or the like to allow parameters to be changed without changing the circuit, flexibility to specification changes, versatility, and the like can be enhanced.

The number of the requesters is not limited to 2. Even when the number of requesters is particularly large, each of the requesters is equally treated and the circuit scale and complication do not significantly increase. Accordingly, an apparatus capable of arbitrating among a large number of requesters can also be easily constructed.

The timing for adding each of the priority decrease values (PERIOD) and the like are not limited to the foregoing. It is also possible to use various variations each capable of providing substantially the same operation. Specifically, when the priority decrease value (PERIOD) is added at the completion of access as described above, e.g., the significance of the value is easily recognizable from the relationship with the request cycle or the like. However, it is also possible to add a value considering a decrease in priority decrease value during access at the time at which access permission is given.

In the access arbiter 100 thus constructed, access by each of the requesters 201 and 202 is surely completed by the time at which the priority control value becomes 0 provided that the predetermined condition is satisfied, as will be described later in detail. In other words, the priority control value shows a time period until the time (deadline) at which access should be completed when a request is issued. Since the requester 201 or 202 having the smallest priority control value (the closest deadline) is selected, it follows that arbitration according to an EDF (Earliest Deadline First) algorithm is performed in the access arbiter 100.

Referring to FIG. 2, an example of the specific operation will be described herein below.

(A) When the request signal is asserted in the state in which the priority control value is the reference priority value (TMIN) on the initiation of arbitration or the like, the priority control value decreases with the lapse of time (priority gradually increases).

(B) When the priority control value becomes smaller than the priority control value of the requester of another request, access is permitted. When the access is completed in the access time (Taccess) and the request signal is negated, the priority control value increases to a value to which the priority decrease value (PERIOD) has been added.

(C) The increased priority control value gradually decreases regardless of the presence or absence of the next request until the priority control value decreases to at least the reference priority value (TMIN).

(D) When there is the next request, the priority control value continues to further decrease even after it has decreased to the reference priority value (TMIN). In due time, access is permitted in the same manner as described above in the interval (B) and the access is completed by the time at which the priority control value becomes 0. Then, the priority control value increases to a value to which the priority decrease value (PERIOD) has been further added.

(E) The priority control value gradually decreases in the same manner as in the interval (C). When the next request has not been issued at the time at which the priority control value decreases to the reference priority value (TMIN), the priority control value is held at the reference priority value (TMIN) until the next request is issued.

(F) When there is the next request, the priority control value begins to decrease. When access is permitted and completed, the priority control value increases to a value to which the priority decrease value (PERIOD) has been added.

(G) The priority control value also gradually decreases. Even though the priority control value is larger than the reference priority value (TMIN), when the priority control value is smaller than the priority control value of the other requester, the access is permitted. However, when the priority control value is larger than the permission suspension priority value (TMAX), access permission is suspended. Therefore, even when requests are repeatedly issued in a short period of time, the priority control value does not exceed a value given by the expression: (Permission Suspension Priority Value (TMAX)+Priority Decrease Value (PERIOD)). As a result, the overflow of the priority control value register 101 is circumvented and, even when the access permission is suspended as described above, the average response time is maintained as stated previously.

When the permission suspension priority value (TMAX) is set to a relatively small value, even though requests are frequently issued, access in a cycle not longer than a predetermined period is prohibited for averaged access. As a result, it is possible to easily perform, e.g., a proper refresh operation for a memory. Conversely, when the permission suspension priority value (TMAX) is set to a large value, it becomes possible to permit consecutive accesses. As a result, it is possible to set high performance to, e.g., a non-real-time requester by setting a large permission suspension priority value (TMAX).

Even when the access permission is not suspended as described above, the arbitrating operation can be properly performed provided that the size of the priority control value register 101 is sufficiently large.

(H) Even though the priority control value is larger than the permission suspension priority value (TMAX), when the priority control value of each of the requesters 201 and 202 is not smaller than the reference priority value (TMIN) (when the busy signal is in the negated state), the priority control value of each or either of the requesters is set to, e.g., the reference priority value (TMIN) and, after a request is issued subsequently or when a request has been already issued, the priority control value begins to decrease from the reference priority value (TMIN).

When the priority control value of each of the requesters 201 and 202 is not smaller than the reference priority value (TMIN), even though the priority control value of each of the requesters 201 and 202 is set to the reference priority value (TMIN), proper access is not impaired, which is obvious from the following viewpoint. That is, when the predetermined condition is satisfied, it is guaranteed to each of the requesters that access is completed within a period not longer than the reference priority value (TMIN). As a result, even when the priority control value is lowered from a value larger than the reference priority value (TMIN) to the reference priority value (TMIN), access by each of the requesters is guaranteed. In addition, because access is guaranteed irrespective of the setting of the priority control value of the other requester, there should be no problem even when the priority control value of the other requester is lowered to the reference priority value (TMIN). Therefore, when the priority control value of each of the requesters is larger than the reference priority value (TMIN), it is possible to change the priority control value of each of the requesters to the reference priority value (TMIN).

When it is determined that arbitration does not fail, access can be permitted even to the requester having the priority control value exceeding the permission suspension priority value (TMAX) by changing the priority control value thereof, as long as situation permits. Therefore, although the priority control value of each of the requesters may be changed to the reference priority value (TMIN), by allowing a change as described above to, e.g., a non-real-time requester, it is possible to easily enhance the performance of a process requested by the non-real-time requester, while guaranteeing necessary access to a real-time requester (while ensuring the real-time property by guaranteeing the longest delay time).

Instead of determining whether or not the busy signal is in the negated state for each of the requesters 201 and 202, it is also allowed to determine whether or not a request has not been issued from either of the requesters 201 and 202. That is, when a request has not been issued, the priority control value does not decrease to a value smaller than the reference priority value (TMIN) so that the same result of determination is obtained. Even when only one requester has issued a request, the requester is immediately allowed access. In such a case, therefore, the priority control value of each or either of the requesters may also be changed. The value to be changed is not limited to the reference priority value (TMIN). Any value may be changed provided that the priority becomes higher than that used as the critical value.

When arbitration as described is performed, the maximum value of the response time from the issue of a request until the completion of access is given by the expression:

$$\max\{(n-1)\times \text{PERIOD}-T(n),0\}+\text{TMIN}$$

(where $T(n)$ is an n-th request time and $\max\{,\}$ indicates the larger value in $\{,\}$). This is because the priority control value stepwise increases by the priority decrease value (PERIOD) every time access responding to each of the first to (n−1)-th requests is completed and decreases by the time elapsed till the time $T(n)$, though the priority control value does not decrease from the reference priority value (TMIN) in the state where there is no request.

(Arbitrable Condition)

Next, a description will be given to a condition (arbitrable condition) for guaranteeing that access responding to any request is surely performed (completed) within a predetermined response time from the issue of the request, i.e., by the time at which the priority control value becomes 0 so long as the request cycle of each of the requesters is not shorter than a predetermined period and to the verification thereof.

For the arbitrable condition, it is sufficient to first consider the case where, when arbitration fails at a given time $t=\text{Terror}$, i.e., at the time $t=\text{Terror}$, the final access by a given requester is not completed and the priority control value becomes 0, determine a condition under which all the previous accesses are permitted and completed, and further determine a condition which satisfies the determined condition for an arbitrary time $t=\text{Terror}$.

The case where arbitration fails can be divided into two failure patterns shown below. It is assumed herein that the priority decrease value (PERIOD) is added at the completion of access, as described above. In the following description, each of the requesters and values associated with the requesters will be generally represented by adding a subscript (j) or the like thereto.

(1) First Failure Pattern

—When the priority control value $P(j)$ of each of the requesters (j) is (Terror−t) or less until access is finally completed—

Figure 3:
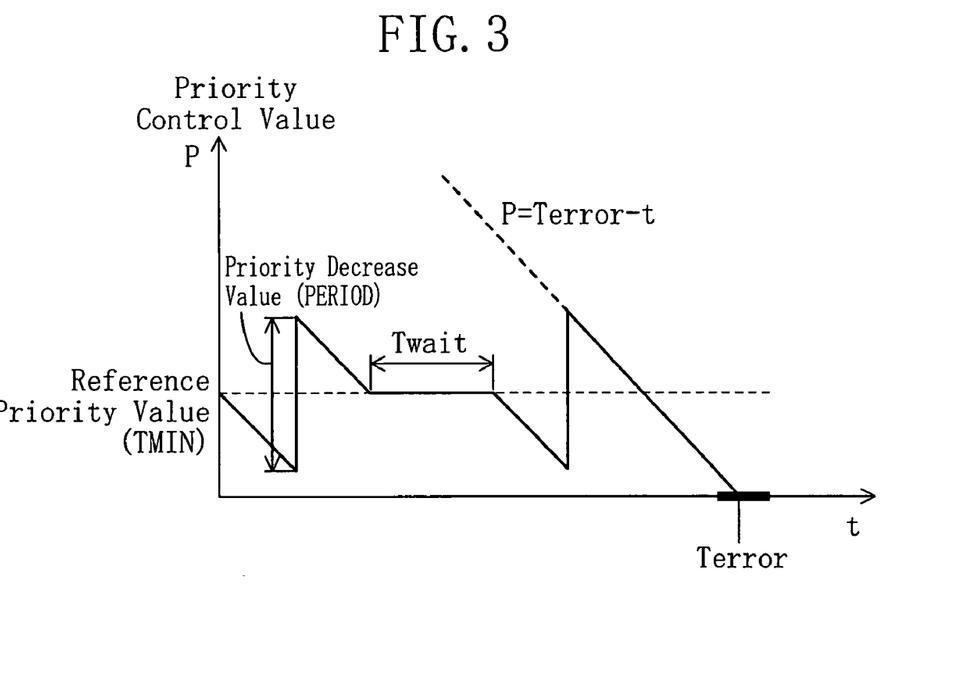
FIG. 3 is an illustrative view showing a process of deriving an arbitrable condition.

As shown in FIG. 3, the priority control value $P(j)$ of each of the requesters (j) at the time t stepwise increases from the reference priority value $(\text{TMIN}(j))$ as an initial value by the priority decrease value $(\text{PERIOD}(j))$ on each completion of access and decreases by t with the lapse of time. When the number of times access by each of the requesters is completed by the time $t=\text{Terror}$ is $n0(j)$ and the total time period during which the priority control value P(j) is held at TMIN(j) is Twait(j), P(j) until the n0(j)-th access is completed is given by the expression (because PERIOD(j) added after the completion of the final access need not be considered):

$$P(j) = TMIN(j) + \{n0(j) - 1\} \times PERIOD(j) - t + Twait(j).$$

In the first failure pattern, the expression:

$$P(j) \leq Terror - t$$

is constantly satisfied for each of the requesters (j). Accordingly, the expression:

$$TMIN(j) + \{n0(j) - 1\} \times PERIOD(j) - t + Twait(j) \leq Terror - t$$

is satisfied. Therefore, the number of access completion times n0(j) described above is given by the expression:

$$n0(j) \leq \{Terror - TMIN(j) - Twait(j)\}/PERIOD(j) + 1 \leq$$
$$\{Terror - TMIN(j)\}/PERIOD(j) + 1 \text{(because } Twait(j) \geq 0).$$

As a result, the number of times access by each of the requesters (j) is completed by the time t=Terror satisfies the expression: {Terror−TMIN(j)}/PERIOD(j)+1 or less. On the other hand, when a time required for access by each of the requesters (j) is Taccess(j) and a time period until access responding to a request from the first requester is permitted and initiated is delay, the total time (Tall) required for accesses by all the requesters is given by the expression:

$$Tall = delay + \Sigma n0(j) \times Taccess(j) \leq$$
$$delay + \Sigma[\{Terror - TMIN(j)\}/PERIOD(j) + 1] \times Taccess(j).$$

When Tall is not more than Terror, it follows that all the accesses prior to the time t=Terror have been surely completed (arbitration has not failed), so that the following numerical expression (1) is established:

$$delay + \Sigma[\{Terror - TMIN(j)\}/PERIOD(j) + 1] \times Taccess(j) \leq \quad (1)$$
$$Terror(\text{the division shown above is a rounding down operation}).$$

Accordingly, when the foregoing numerical expression (1) is established for arbitrary Terror and the request cycle of each of the requesters is not shorter than a specified period, it is guaranteed that access responding to any request is permitted and completed by the time at which the priority control value becomes 0, i.e., within the predetermined response time from the issue of the request.

(2) Second Failure Pattern
—When there is any requester (j) which completes access before the time t=Terror and having the priority control value P(j) larger than (Terror−t)—
In this case, it is sufficient to consider only an operation after the final request having the priority control value P(j) larger than (Terror−t) is permitted. More specifically, it is sufficient to consider the case where the priority control value P(j) after a request from the requester (k) is permitted and access is completed until the final access is completed by the time t=Terror is (Terror−t) or less, as shown in, e.g., FIG. 4 (in which it is assumed for convenience that the timing 1 clock cycle after access permission is given to the requester (k) is t=0 and access is performed during the period of Taccess(k) after the lapse of only (delay−1) therefrom).

The following is the reason why it is sufficient to consider only the case shown above.

Figure 4:
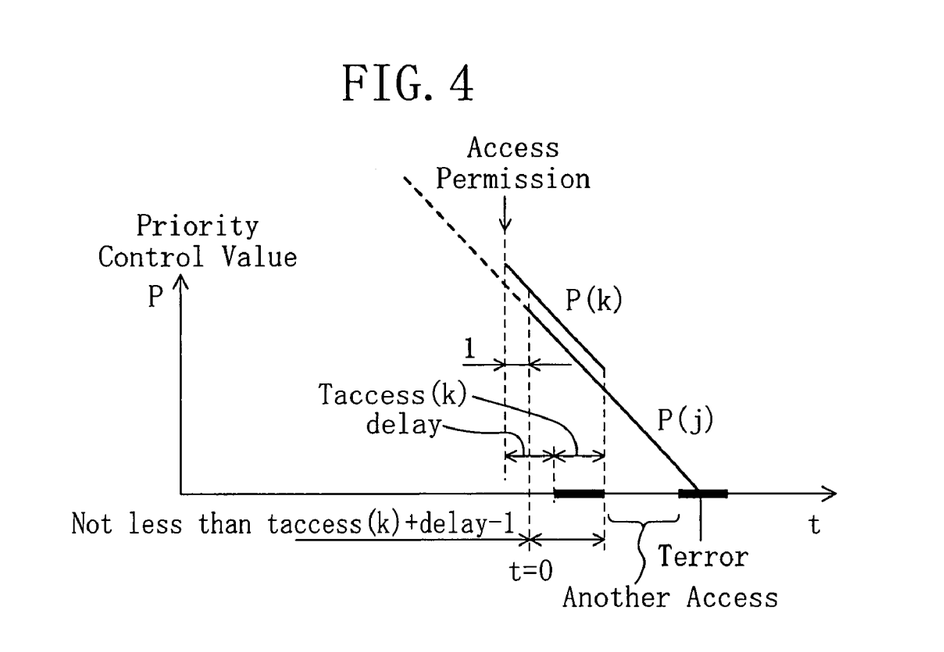
FIG. 4 is an illustrative view showing a process of deriving another arbitrable condition.

It is unnecessary to consider another requester (j) from which a request is issued before t=−1 because, when the priority control value P(j) thereof is smaller than the priority control value P(k), access by the requester (k) is permitted after access by the requester (j) is completed (the state of FIG. 4 is reached). On the other hand, when the priority control value P(j) is larger than the priority control value P(k), access permission to the requester (j) is given at the time t=Terror or thereafter. Accordingly, it is also unnecessary to consider the requester (j). The same shall apply to the case where the requester (k) issues a request again after the access in the drawing (from the foregoing, it may be considered that there is no request from the requester (j) other than the requester (k)).

It is also unnecessary to consider another requester having the priority control value P which becomes larger than (Terror−t) after access by the requester (k). When there is such a requester, the state of FIG. 4 is eventually reached so that it is appropriate to consider the requester (k) as a representative.

In the case of the second failure pattern, it may be considered that there is no request from the requester (j) other than the requester (k). Accordingly, the priority control value P(j) thereof is not smaller than TMIN(j) (TMIN(j)+α) is assumed). When the number of times access by each of the requesters is completed in the interval between the time t=0 and the time t=Terror is n1(j), P(j) from the time t=0 until the completion of the n1(j)-th access is given by the following expression using the same logic as in the numerical expression (1):

$$P(j) = \{TMIN(j) + \alpha\} + \{n1(j) - 1\} \times PERIOD(j) - t + Twait(j).$$

In the second failure pattern, the expression:

$$P(j) \leq Terror - t$$

is constantly satisfied for each of the requesters (j), so that the expression:

$$\{TMIN(j) + \alpha\} + \{n1(j) - 1\} \times PERIOD(j) - t + Twait(j) \leq Terror - t$$

is satisfied. Therefore, the number of access completion times n1(j) is given by the expression:

$$n1(j) \leq \{Terror - TMIN(j)\}PERIOD(j) + 1 \text{(because } \alpha \geq 0, Twait(j) \geq 0).$$

On the other hand, the total time (Tall) of accesses from all the requesters is given by the following expression also in the same manner as in the numerical expression (1):

$$Tall = \{delay - 1 + Taccess(k)\} + \Sigma n1(j) \times Taccess(j) \le$$
$$\{delay - 1 + Taccess(k)\} +$$
$$\Sigma[\{Terror - TMIN(j)\}/PERIOD(j) + 1] \times Taccess(j).$$

When Tall is not more than Terror, it follows that all the accesses prior to the time t=Terror have been surely completed (arbitration has not failed). Therefore, the following numerical expression (2) is established:

$$\{delay - 1 + Taccess(k)\} + \quad (2)$$
$$\Sigma[\{Terror - TMIN(j)\}/PERIOD(j) + 1] \times Taccess(j) \le$$
$$Terror\text{(the division shown above is a rounding down operation}$$
$$\text{and } j \text{ in the brackets headed by } \Sigma \text{ does not satisfy } j = k\text{)}.$$

Accordingly, when the foregoing numerical expression (2) is established for arbitrary Terror and the request cycle of each of the requesters is not shorter than a specified period, it is guaranteed that access responding to any request is performed by the time at which the priority control value becomes 0, i.e., within the predetermined response time from the issue of the request.

Therefore, when each of the foregoing numerical expressions (1) and (2) is satisfied, it can be guaranteed that arbitration is performed in any case, while the priority control value is prevented from becoming 0.

Although the foregoing numerical expressions (1) and (2) have thus been derived based on the operation of the access arbiter 100 according to the present embodiment, it is also possible to construct another access arbiter using the EDF method as long as it is guaranteed that arbitration can be performed in accordance with the numerical expressions (1) and (2). In other words, as long as it is shown that arbitration can be performed by any method, arbitration can be surely performed even in the access arbiter using the EDF method. Therefore, verification as described above can be widely used for the verification of arbitrability in various access arbiters.

Although the examples using $\le$ have been shown in the foregoing numerical expressions (1) and (2), the condition may also be given in an expression using < in accordance with the manner in which clock timing is considered or the like.

(Arbitrable Condition Verification Device)

Figure 5:
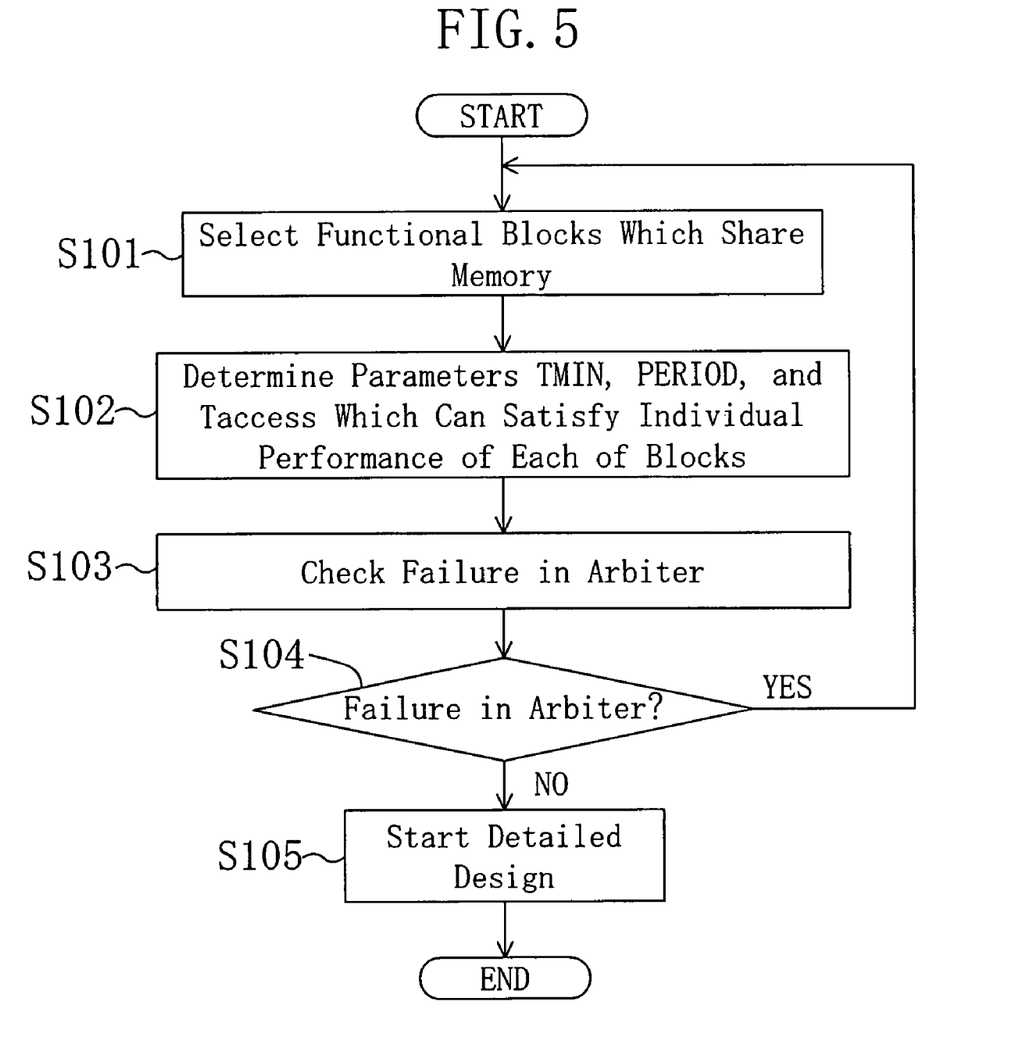
FIG. 5 is a flow chart showing the operation of an arbitrable condition verification device.

Next, a description will be given to a design device (arbitrable condition verification device) in which the foregoing numerical expressions (1) and (2) are utilized. Although the design device is not particularly limited, it can be constructed by, e.g., incorporating software which exerts various functions as shown in FIG. 5 into a computer.

(S101) First, functional blocks which access, e.g., a shared memory as an access target are determined.

(S102) The reference priority value (TMIN) and the priority decrease value (PERIOD), which are request parameters for memory access by each of the functional blocks and the time (Taccess) required for access by each of the functional blocks are determined. These values and the time correspond to the required response time (delay time), request cycle (required bandwidth), data forwarding ability, input/output speeds, and the like.

It is also possible to perform the determinations in the steps (S101 and S102) outside and allow only the foregoing parameters and the like to be inputted from an input unit.

(S103) By using the foregoing numerical expressions (1) and (2), the feasibility of the entire access arbiter, i.e., whether or not a predetermined number of various Terror values are feasible.

(S104) It is determined whether or not arbitration fails and, when arbitration fails, the whole process flow returns to the step (S101) where the sorting out of functional blocks which access the shared memory and the changing of the arbitration request parameters are performed and evaluation is repeated.

(S105) On the other hand, when arbitration is determined to be possible by the determination in the step (S104), detailed circuit design of each of the functional blocks, the shared memory, memory buses, and the like which satisfies the parameters shown above is performed. This allows easy construction of an optimum system without resulting in exaggerated specifications. It is also possible to check whether or not an error signal is outputted from the priority control value control unit 102 when the priority control value becomes 0 by simulation or using a real debugger in accordance with the stage of design and fabrication.

INDUSTRIAL APPLICABILITY

An access arbiter according to the present invention has the effect of allowing efficient arbitration capable of achieving, e.g., compatibility between real time-property and performance to be implemented with a simple circuit for bus arbitration when a plurality of processes and devices (requesters) share a memory. Therefore, the access arbiter according to the present invention is useful as an access arbiter used for controlling a memory interface or a task or the like.

What is claimed is:

1. An access arbiter for arbitrating between access requests from a plurality of requesters to an access target, the access arbiter comprising:
   priority holding means for holding a priority of access permission to each of the requesters;
   priority control means operatively coupled to the priority holding means and for controlling the priority held by the priority holding means; and
   access permitting means operatively coupled to the plurality of requesters and for giving access permission to the requester having the highest priority held by the priority holding means, wherein,
   when there is an access request from the requester, or when there is no access request and the priority is lower than a predetermined reference priority, the priority control means increases the priority by a predetermined degree of increase in accordance with an elapsed time and,
   when access is permitted, the priority control means decreases the priority by a predetermined degree of decrease, said predetermined degree of decrease is independent of the priority when access is permitted.

2. The access arbiter of claim 1, wherein each of the degrees of increase and decrease of the priority is set for each of the requesters.

3. The access arbiter of claim 1, wherein the decrease of the priority is performed at a time at which the access by the requester is completed.

4. The access arbiter of claim 1, wherein the access permitting means is configured not to give access permission to the requester when the priority of the requester is lower than a predetermined priority.

5. The access arbiter of claim 1, wherein the priority control means is constructed to set the priority to at least any predetermined one of the requesters to the reference priority when the priorities to all the requesters are lower than the reference priority.

6. The access arbiter of claim 1, wherein the priority control means is constructed to set the priority to at least any predetermined one of the requesters to the reference priority when there is no access request from any of the requesters.

7. The access arbiter of claim 1, wherein the priority control means is constructed to set, when there is an access request from only one of the requesters, the priority to at least any predetermined one of the other requesters from which there is no access request to the reference priority.

8. The access arbiter of claim 1, wherein the priority control means is constructed to output an error signal when the access permission is not given to any of the requesters until the priority reaches a predetermined limit priority.

* * * * *